Aug. 10, 1937.  R. A. CARLSON  2,089,930
MACHINE TOOL SPINDLE CONSTRUCTION
Filed July 3, 1935
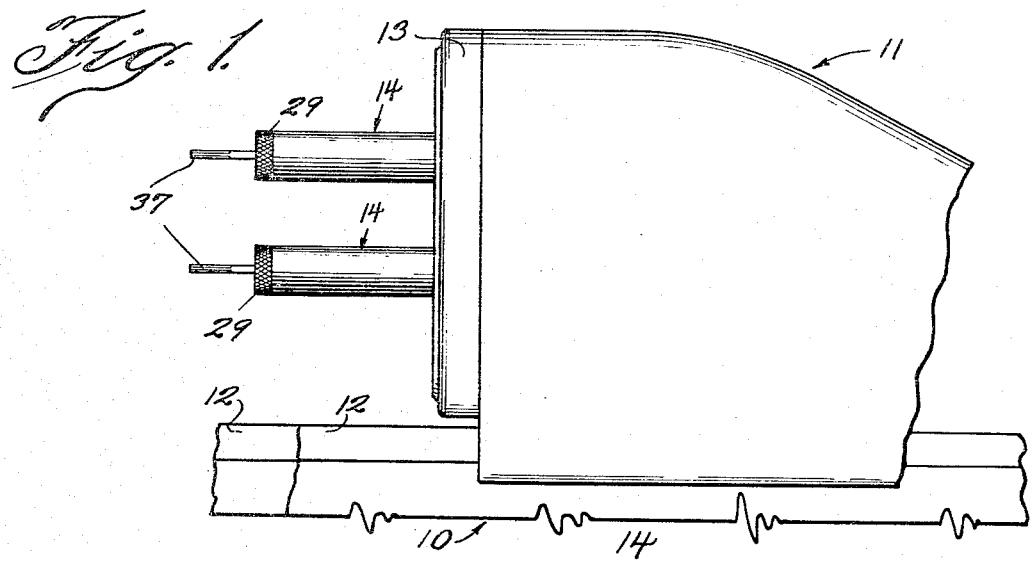
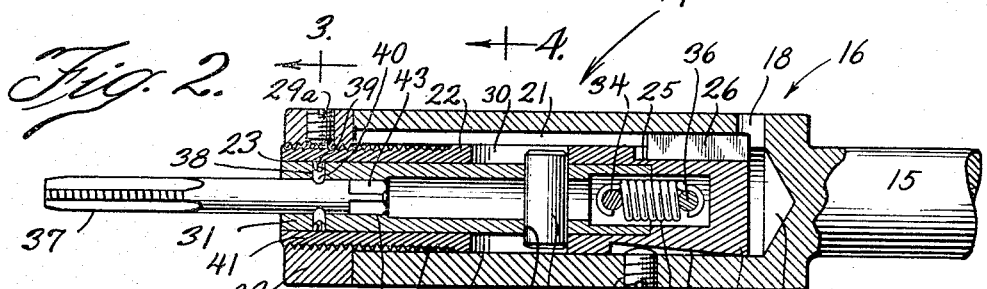
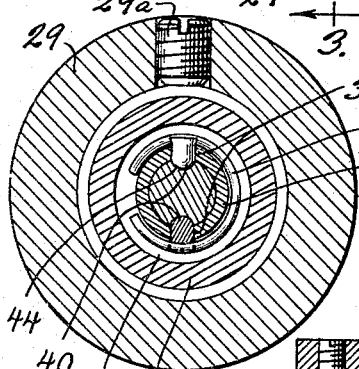
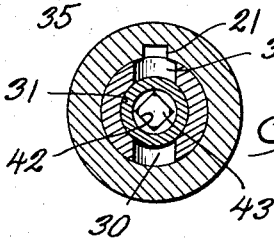
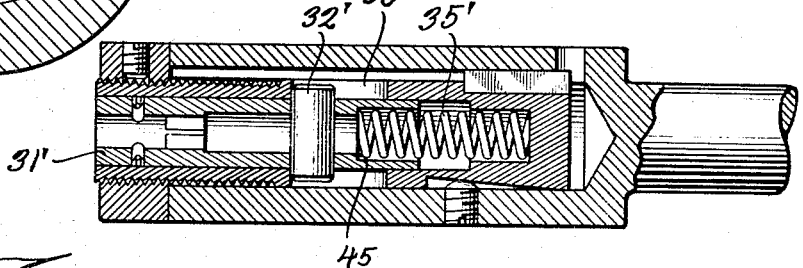
Inventor:
Raymond A. Carlson
By Edward C. Fritzbaugh Atty.

Patented Aug. 10, 1937

2,089,930

UNITED STATES PATENT OFFICE 2,089,930

MACHINE TOOL SPINDLE CONSTRUCTION

Raymond A. Carlson, Rockford, Ill.

Application July 3, 1935, Serial No. 29,597

9 Claims. (Cl. 279—9)

This invention has to do with a machine tool spindle, and relates more particularly to an adjustable compact spindle construction adapted to detachably hold a tool.

Heretofore spindles of the general type of that embodying the present invention have been made for receiving within an end a machine tool such as one for tapping or threading premade recesses within a piece of work. Such tools have also been made with an end structure adapted to receive means for adjustably holding a machine tool. Presently made adjustable tool holding means of this type, however, project beyond the end of the spindle, thereby increasing the overall length of the spindle mechanism. It follows that the overall dimensions of a machine having one or more spindles for operating upon work of a certain size must be increased in an amount equal to the increase of the overall length of the combined spindle and adjustable tool holding means projecting from an end of the spindle or spindles.

An object of the present invention is the provision of an improved spindle adapted to adjustably hold a tool, and being of substantially the same length as conventional spindles unadapted to adjustably hold a tool.

Another object of the present invention is the provision of a novel spindle construction including a recessed spindle containing mechanism adjustable longitudinally therein for holding a machine tool.

Another object of the present invention is the provision of a new hollow spindle open at an end and containing adjustable tool holding means substantially entirely within the hollow section thereof.

Still another object of the present invention is the provision of an improved recessed machine tool spindle having an axial opening and containing within the recessed section thereof in adjustable telescopic relation therewith, means for holding a tool inserted through the axial opening into the spindle.

With the above and other desirable objects in view, the following description is set forth in conjunction with the accompanying single sheet of drawings hereby made a part of this specification, and wherein:

Fig. 1 is a fragmentary perspective view of a machine employing spindles constructed in accordance with the present invention;

Fig. 2 is a longitudinal cross sectional view of a spindle embodying a form of the present invention;

Figs. 3 and 4 are transverse sectional views taken on the lines 3—3 and 4—4, respectively, of Fig. 2; and Fig. 5 is a view similar to Fig. 1 of a modified form of the invention.

The same reference characters are used for designating similar parts throughout the various figures of the drawing and in the description that follows.

The type of machine tool spindle herein illustrated and described is adapted for use in a machine employing either a single one or a plurality of spindles. In a multiple spindle machine the spindles are carried upon a head containing a gear cluster, from which all of the spindles are driven. Machines of this kind are commonly used for the concurrent drilling, reaming, or tapping of a plurality of holes in a piece of work such as an engine block.

In Fig. 1 there is shown a machine having a bed 10 upon which there is reciprocally mounted a head 11. The bed 10 comprises the conventional rails 12 along which the head is disposed for movement. The drawing illustrates rails arranged horizontally, although it is readily conceivable that the machine may comprise vertically disposed rails carrying a vertically reciprocal head 11. Means (not shown) is employed for moving the head 11 in either direction along the rails 12.

Extending to the left from the face plate 13 of the head 11 is a number of spindles 14, each of which is an embodiment of the present invention. The spindles 14 may be driven by a common gear cluster (not shown) within the head 11 of the machine.

Reference should now be had to Fig. 2, which illustrates in detail the construction of a spindle 14. The spindle 14 includes a shank 15 which, when in combined assembly with a machine, extends through the suitably apertured face plate 13 into the head 11 where driving engagement is had with the hereinabove mentioned gear cluster. The spindle 14 has an enlarged section 16 recessed at 17. Within the wall of the enlarged section 16 of the spindle, and near the shank 15 is an opening 18, which provides a means of access to the spindle's interior. The opening 18 further acts as a breather incident to movement of parts axially within the spindle. A second wall opening in the section 16 of spindle 15 is indicated by the reference character 19. The opening 19 is threaded to receive a set screw 20, the purpose of which will be hereinafter explained. Within the upper interior of the recess 17, Fig. 2, and extending axially of the spindle 15, is a keyway 21.

Within the hollow section of the spindle 14 is a sleeve-like tool carrier member 22 having an open end 23, and a closed end 24. A seat 25 is formed in a back peripheral section of the sleeve 22 for the reception of a key 26. Key 26 fits within the keyway 21 of the spindle in a manner precluding relative rotative movement of the sleeve and spindle, and permitting of relative axial movement thereof. Upon the lower rear section of the sleeve member 22 is an inclined face 27 extending more deeply into the sleeve wall from a point at the rear end thereof toward the front end. The more forward exterior portion of the sleeve 22 is threaded as indicated at 28. A nut 29 is adapted to be screwed onto the threaded section 28, and a set screw 29a is provided for securing the nut 29 in any selected position upon the threaded section of the sleeve. Diametrically opposed slots 30 are formed within the wall of the sleeve 22.

A tool holder 31 having a cylindrical exterior surface is fitted into the sleeve 22. The tool holder 31, however, and the interior of the sleeve 22, may be of a shape other than cylindrical, if desired, so long as the contacting surfaces of the two members are adequate to provide for stability or rigidness within the assembly. A pin 32 is passed diametrically through the tool holder 31 by way of apertures 33 and into the slots 30 of sleeve 22, thereby permitting of relative longitudinal movement of the tool holder and sleeve, but preventing relative rotative movement thereof. Within a rear section of the tool holder member 31 is a pin 34 to which is connected one end of a contraction spring 35, the opposite end of the spring being hooked around a complemental pin 36 anchored in a rear section of the sleeve 22.

Collet means is provided in a front section of the tool holder member 31 for detachably holding a tool 37. A number of radially disposed apertures 38 are formed in the body of the tool holder 31 and within the bottom of a groove 39 encircling the tool holder. Small plunger-like members 40 are inserted into the apertures 38. Normally, the plungers are held fully seated in their respective apertures so as to project a short distance into the interior of the tool holder. A resilient ring 41 fitting into the groove 39 is employed for urging the plungers 40 into their innermost seated position. This construction is plainly shown in Fig. 3. In Fig. 4 it will be seen that the interior of the tool holder has a square section 42 for engaging the square end 43 of the tool 37 thus preventing relative rotative movement between the tool and the tool holder. While the tool 37 is being inserted into the tool holder 31, plungers or keys 40 are forced outwardly by the body of the tool against the resilient ring member 41 until such time when small pockets 44 within the tool arrive in registry with said keys or when the tool is forced home. At that time the ring 41 presses the keys 40 into the pockets 44 to effect a semi-positive lock between the tool 37 and the tool holder 31.

Normally, the parts of the device will be in the position illustrated in Fig. 2. That is, the tool holder 31 which is movable axially of the tool holder carrier is ordinarily held to the right, Fig. 2, by the contraction spring 35. The reciprocal limits of the tool holder 31 relative to the sleeve are determined by the ends of the slots 30, which can be abutted by the pin 32.

Manipulation of the nut 29 and the set screw 20 makes it possible to adjust the relative axial relationship of the sleeve 22 and the tool holder therein to the spindle 14. For example, the sleeve 22 may be moved to the left by first loosening the set screw 20 and thereafter turning the nut 29 in a direction to advance it to the right along the sleeve, thereby placing the nut in engagement with the open end of the spindle 15, and drawing the sleeve 22 to the left until a different portion of the inclined section 27 of the sleeve is carried into firm engagement with the inner end of the set screw 20. The two members 29 and 20 make it possible to obtain any relative axial position of the sleeve 22 and the spindle 14 within certain limits. When the sleeve 22 is drawn firmly against the inner end of the set screw 20 incident to the tightening of the nut 29 against the end of spindle 15, the wedging action of the set screw upon the inclined face of the sleeve will insure a tight fit between the parts. Adjustment of the parts in the opposite direction is accomplished by loosening the nut 29, that is, turning it in a direction upon the threaded portion of the sleeve 22 as to advance it to the left away from the contiguous end of spindle 15. Thereafter, the whole assembly within the hollow section of the spindle may be shifted to the right where it may be maintained by advancing the set screw 20 inwardly into engagement with the surface 27.

The device shown in Figs. 1, 2, 3 and 4 is for use under such conditions as when the tool is adapted to advance into the work without axial pressure. If the tool should advance into the work at a greater speed than the head 11 is moved toward the work, the key 26 and the pin 32 will continue to provide tortional force to the tool, while the spring 35 will permit the tool 37 to move forward relative to the spindle and the machine head 11.

That form of the device shown in Fig. 5 is identical in all respects to that shown in Figs. 1, 2, 3 and 4 with the exception of the type of spring employed thereby for determining the normal relative position between the tool holder member and the sleeve for carrying such member. Corresponding reference characters are used for designating like parts in the two forms of the invention, the reference characters in the second form being distinguished by the use of a "prime." The device shown in Fig. 5 embodies a compression spring 35' which exerts a force between the right end of the sleeve 22' and a seat 45 upon an end of the tool holder 31'. Under normal conditions, the spring 35' maintains the tool holder 31' in its most advanced position to the left, Fig. 5, with the cross pin 32' in abutted relationship with the left ends of slots 30' in the sleeve. This particular type of spindle is for use in combination with a tool which requires pressing into the work. Should the tool fail to move into the work at as great a speed as the spindle is moved by the machine head 11 in the direction of the work, the spring 35 will permit of the tool holder being displaced backwardly into the hollow spindle.

In either of the two types of spindles shown, the parts for adjustably and releasably engaging the tool are adapted to be contained entirely within the spindle. Manifestly, a machine fitted with a spindle of the present type designed to receive and hold a tool at a lesser distance from the machine head is thereby made capable of accommodating a larger piece of work. Novelty exists in the extreme simplicity and compactness of the construction.

What I claim as new, and desire to secure by Letters Patent is:

1. In combination, a hollow spindle open at an end to permit of the projection of a tool thereinto, a carrier member adjustable axially within said spindle, and a tool holder adjustably disposed within said carrier member adapted to operatively engage a tool extending into the open end of said spindle.

2. A spindle construction comprising an open ended spindle, a carrier member adjustable axially within said spindle, a tool holder normally substantially wholly within said carrier member and said spindle and movable axially therein whereby to extend exteriorly of said carrier member and spindle through such open spindle end, and means yieldingly constraining such axial movement of said tool holder.

3. A spindle construction comprising a hollow spindle having an end opening, a carrier member adjustable axially within said spindle, a tool holder having tool engaging means thereon, said tool holder being axially movable relatively to said carrier member between a position substantially wholly within said member and a position wherein the tool holder projects a substantial distance from an end of said carrier member, and means yieldingly urging said tool holder toward one of such positions.

4. A spindle construction comprising a hollow spindle having an end opening, a carrier member axially adjustable in said spindle between a position substantially wholly within said spindle and a position with a portion of said carrier member projecting outwardly through such end opening, and a tool holder substantially entirely within said carrier and adjustable axially thereof.

5. A spindle construction comprising a hollow spindle having an end opening, a carrier member in said spindle, and a tool holder in said carrier member, said spindle, carrier member and tool holder being adjustable relatively axially, the carrier member being adjustable between a position wherein a portion thereof extends outwardly through such spindle end opening and a position substantially completely within said spindle, and said tool holder being adjustable between a position wherein a portion extends outwardly beyond an end of said carrier member and a position substantially wholly within said carrier member.

6. A spindle construction comprising a hollow spindle having an axial opening, a carrier member in said spindle, a tool holder in said carrier member, said carrier member being axially adjustable in said spindle between a position wherein a portion of the carrier member projects outwardly through such spindle opening and a position wherein the carrier member is substantially entirely within said spindle, said tool holder being reciprocable axially of said carrier member between a position wherein a portion of the tool holder projects beyond an end thereof and a position wherein the tool holder is substantially wholly within said carrier member, and means urging said tool holder toward the position farthest within the carrier member.

7. A spindle construction comprising a hollow spindle having an axial opening, a carrier member in said spindle, a tool holder in said carrier member, said carrier member being axially adjustable in said spindle between a position wherein a portion of the carrier member projects outwardly through such spindle opening and a position wherein the carrier member is substantially entirely within said spindle, said tool holder being reciprocable axially between positions providing for confinement of the tool holder substantially wholly within the carrier member, and means yieldingly urging said tool holder toward the spindle opening.

8. A spindle construction comprising a hollow spindle, a hollow carrier in said spindle and adjustable axially thereof, and a tool holder substantially entirely within said carrier and adjustable axially thereof, said tool holder having a tool engaging part within the confines of both said carrier and said spindle.

9. A spindle construction comprising a hollow spindle, a set screw adjustable transversely of said spindle in a wall thereof, a hollow carrier in said spindle and adjustable axially of said spindle, there being on said carrier a surface convergent upon the axis thereof and movable against said screw to determine the axial adjustment of said carrier, said carrier also having a threaded end section projecting outwardly of said spindle, and a nut bearing against said spindle and advanceable upon such threaded section to draw said carrier into a selected adjustment with the converging surface thereof bearing against said screw.

RAYMOND A. CARLSON.